3,010,008
SYSTEM AND APPARATUS FOR INTERCONNECTING PIPE SECTIONS BY WELDING
William B. Handwerk and Estill Sherrill, Tulsa, Okla., assignors to Crose-Perrault Equipment Corporation, a corporation of Oklahoma
Filed Aug. 18, 1958, Ser. No. 755,666
12 Claims. (Cl. 219—60)

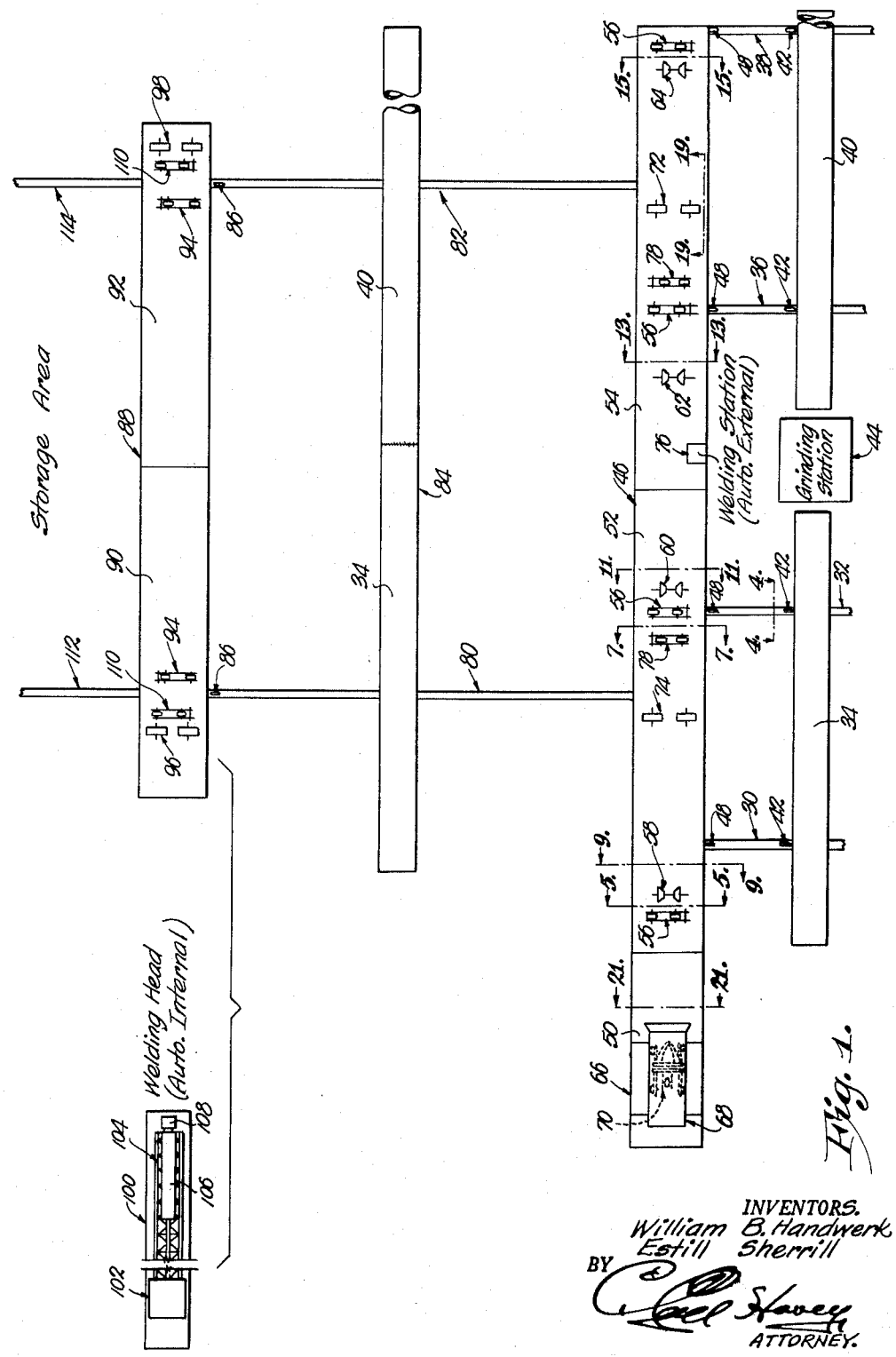

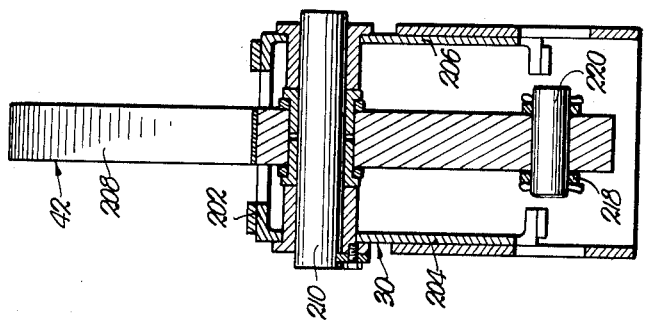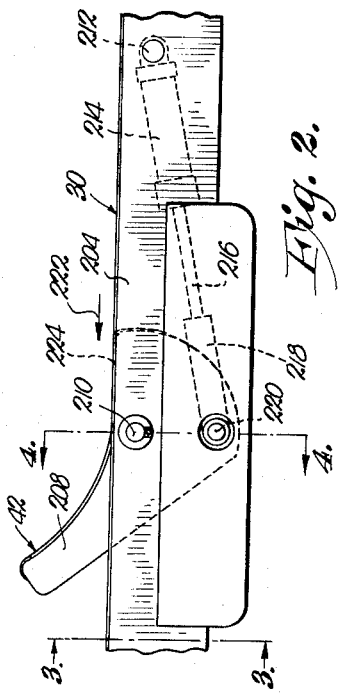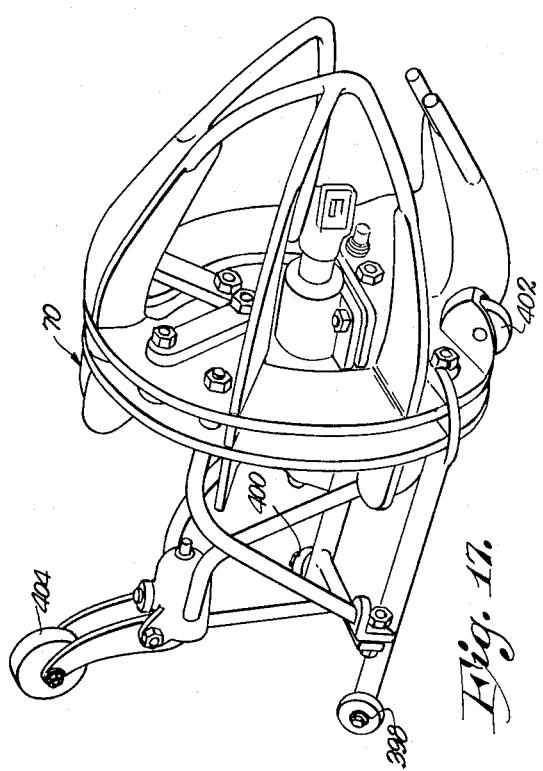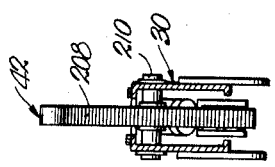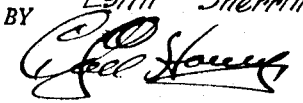

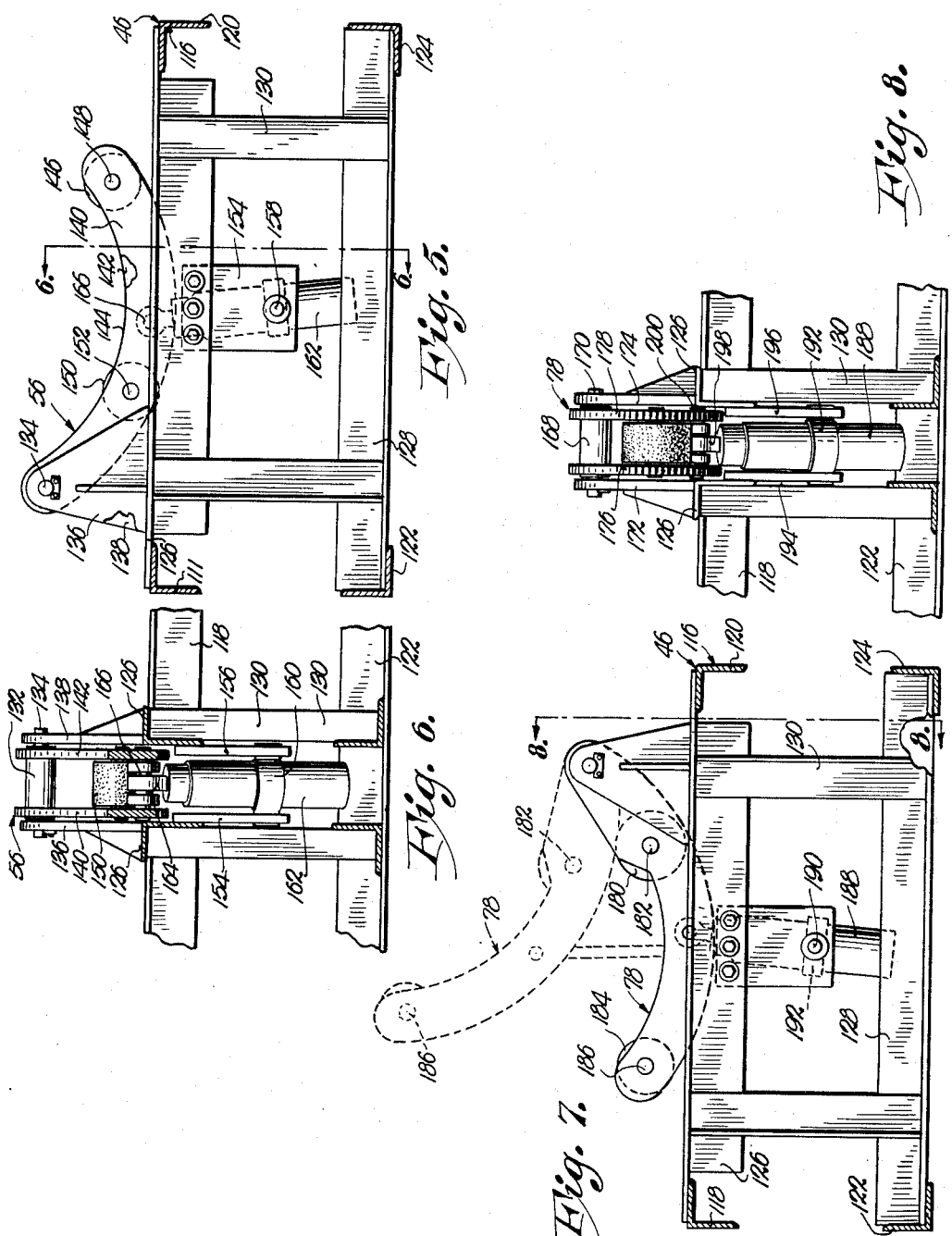

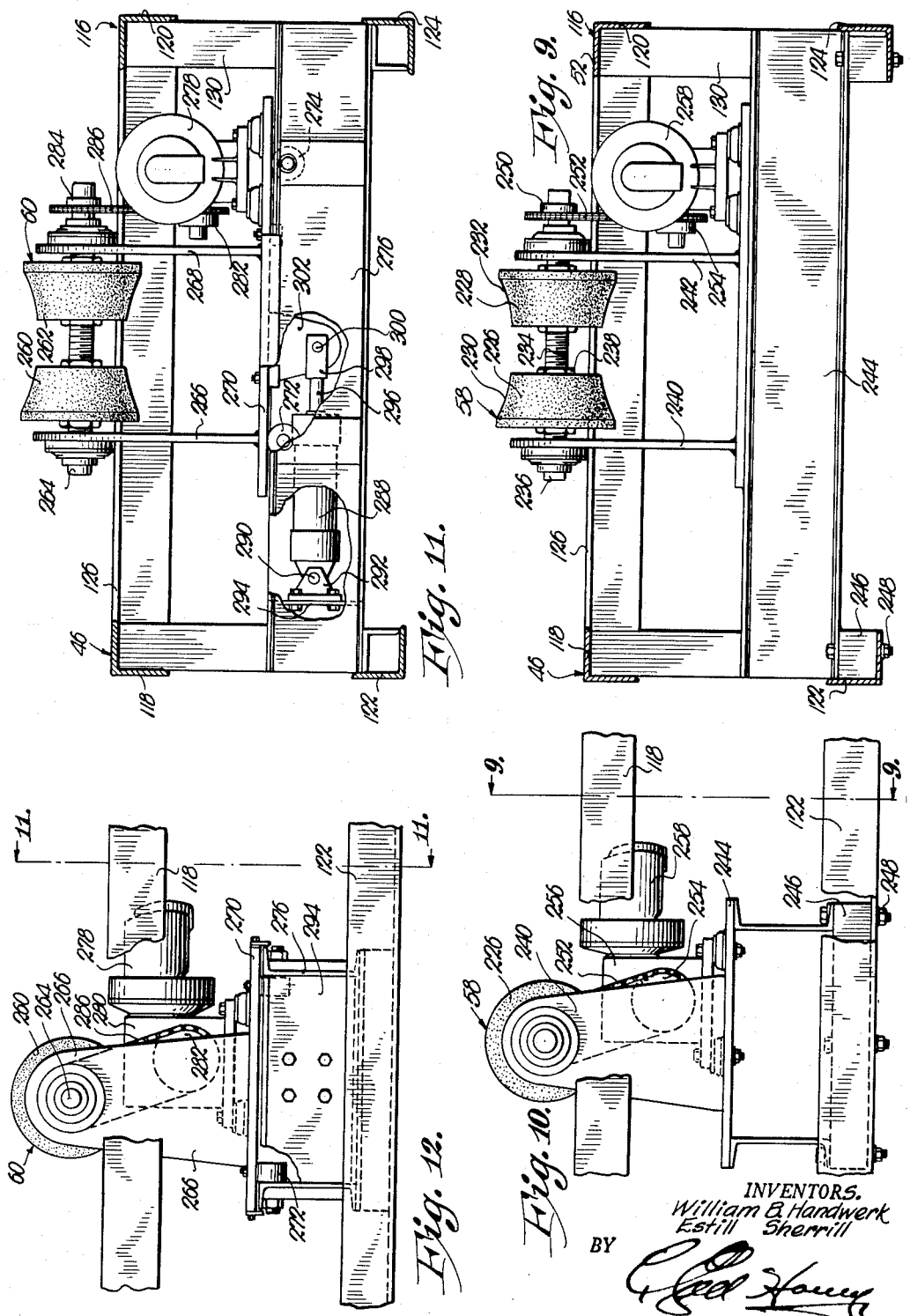

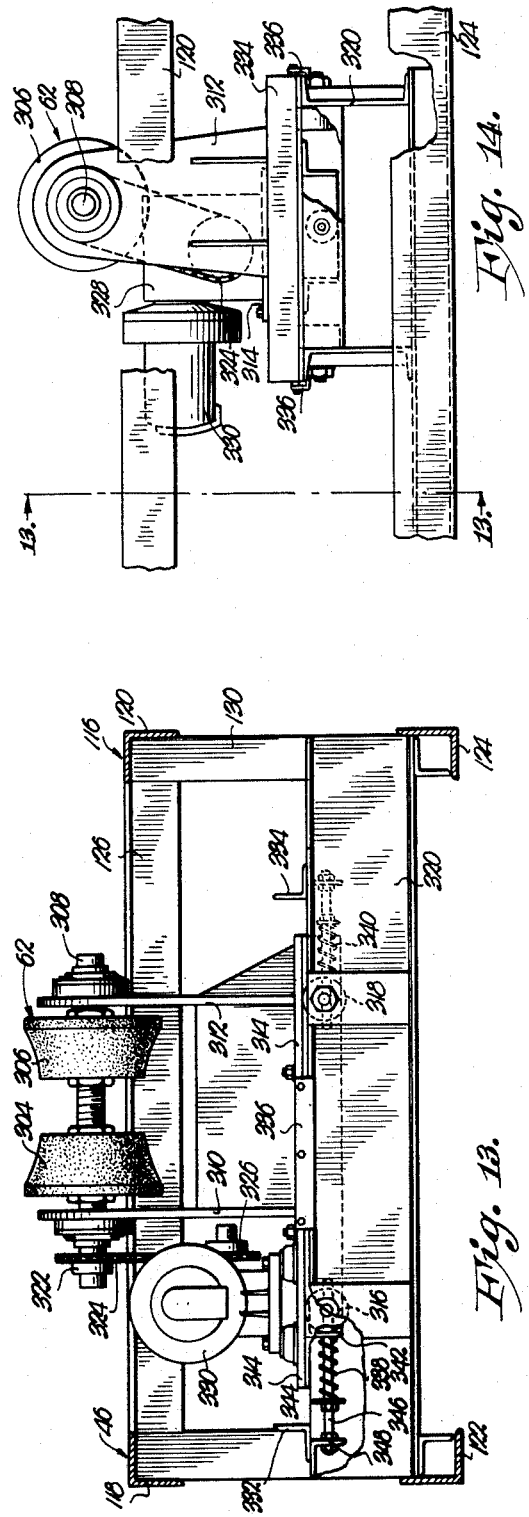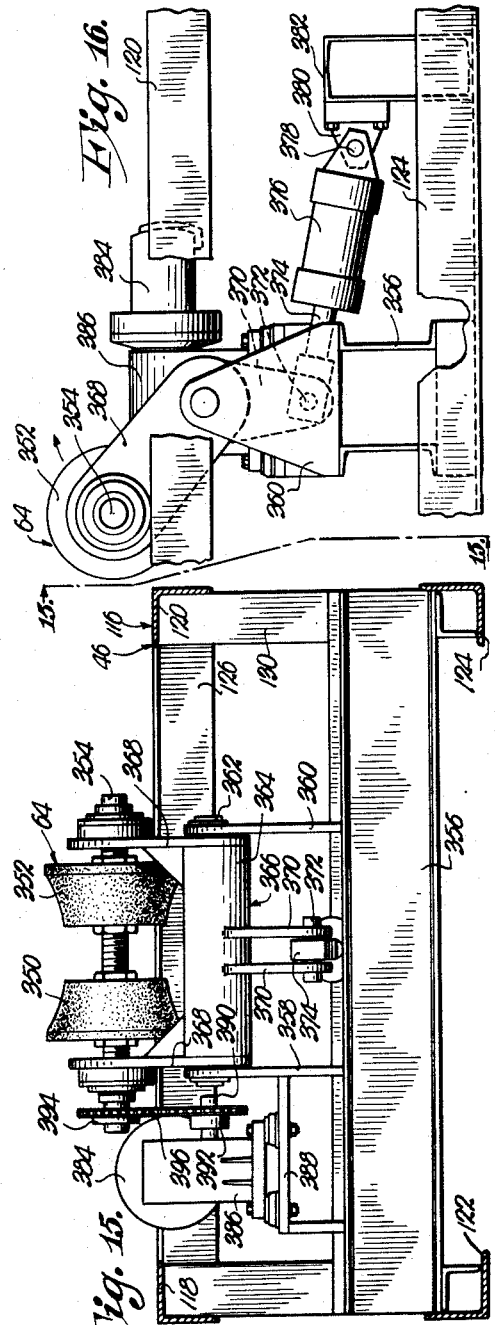

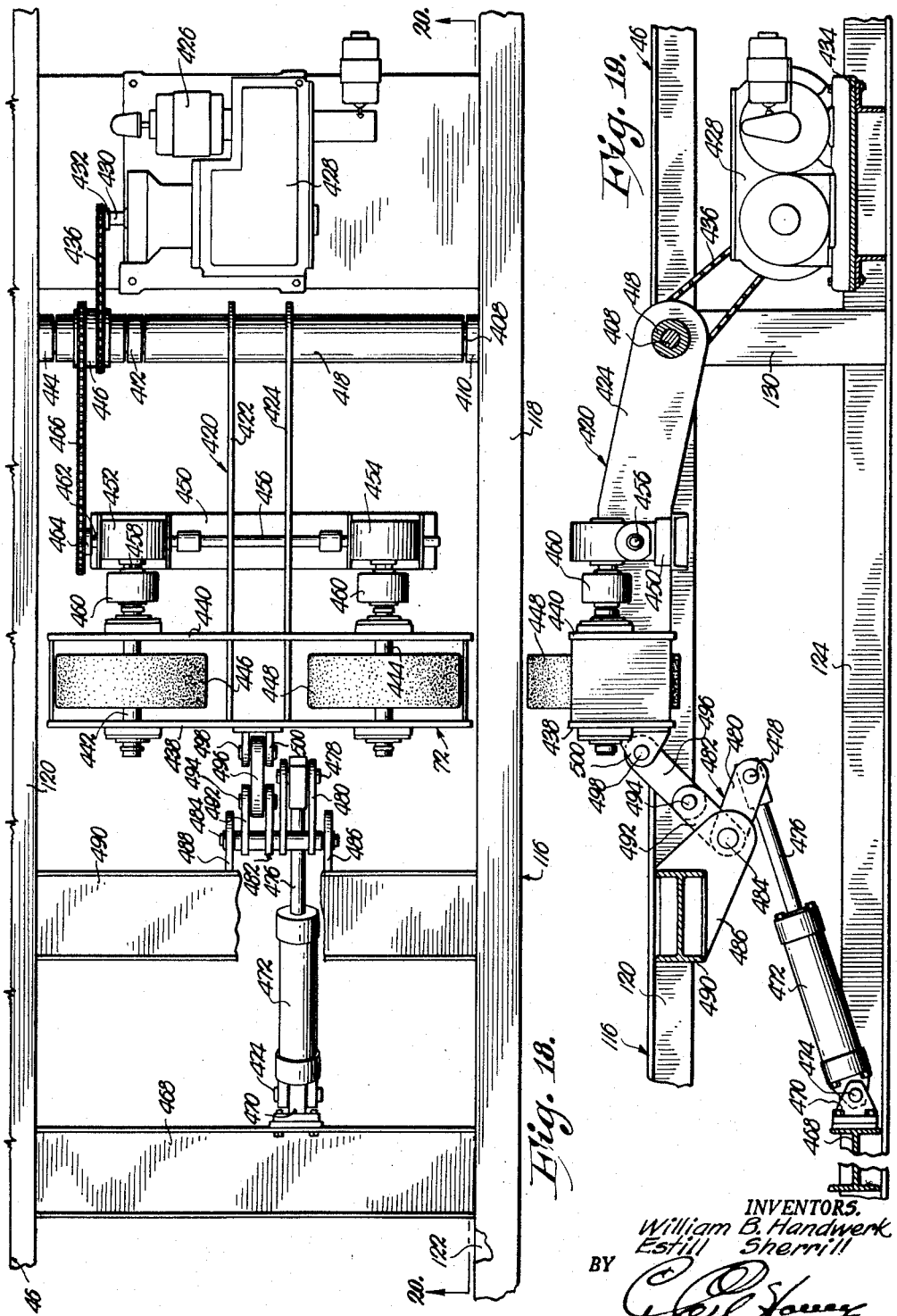

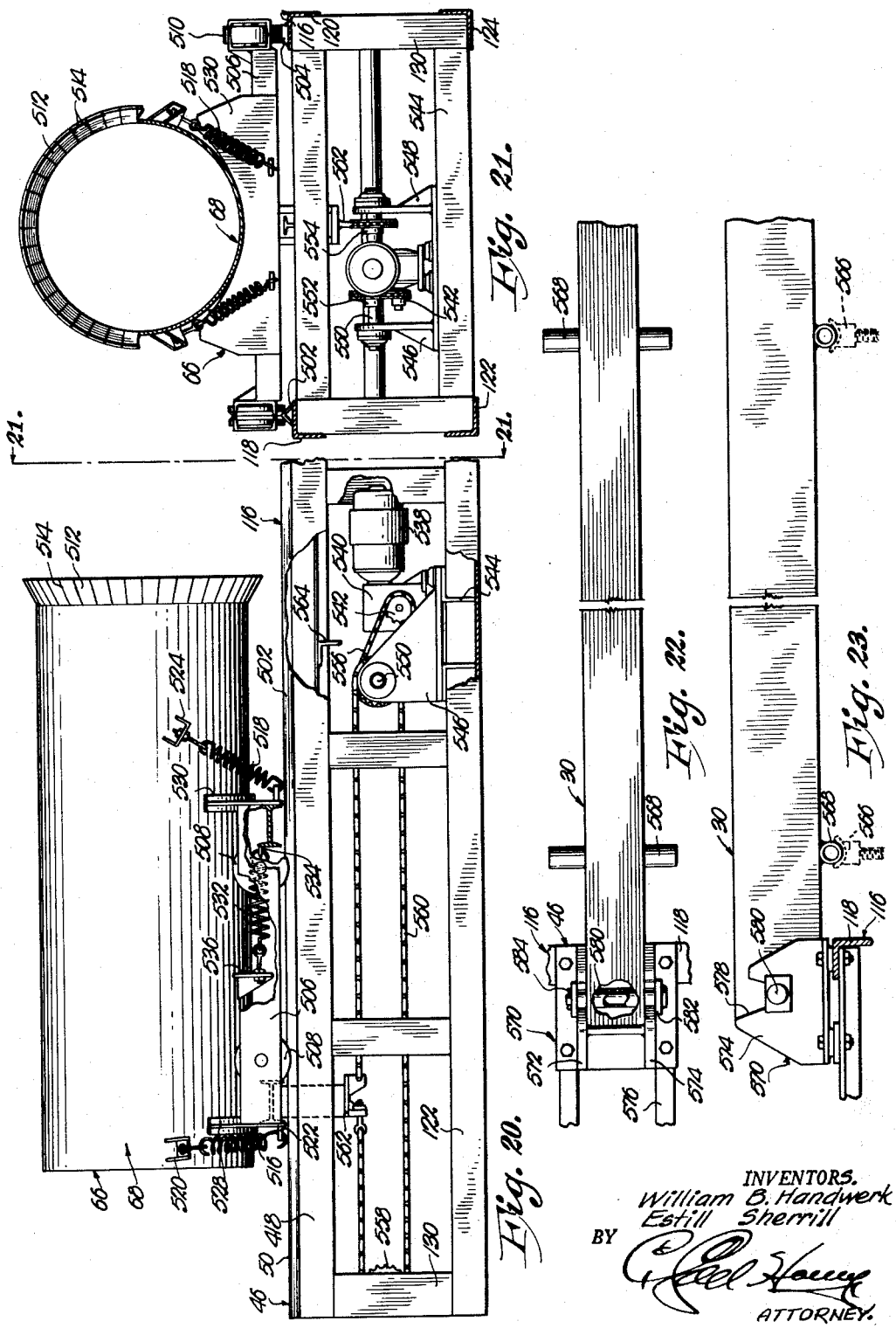

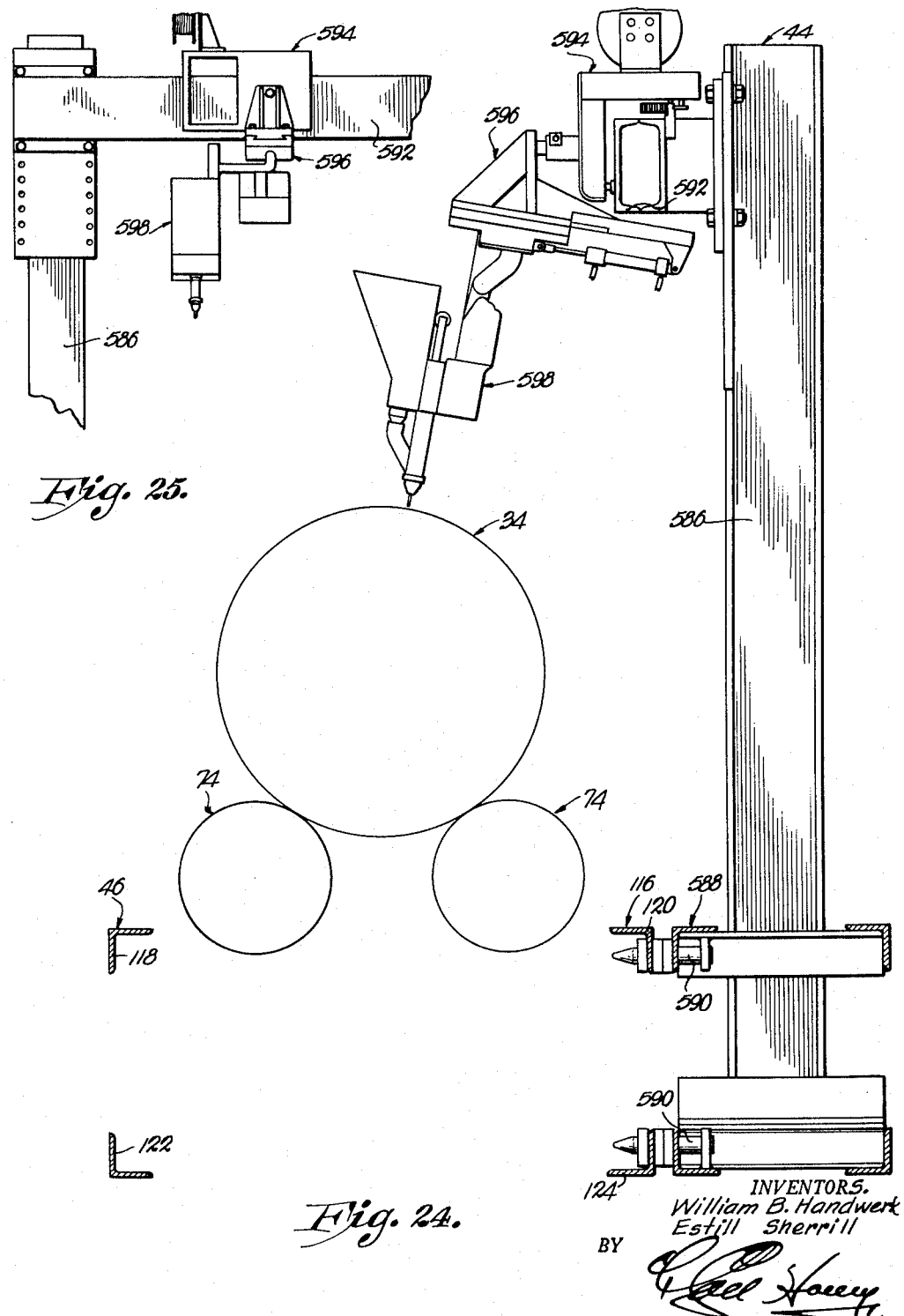

This invention relates to an improved system and apparatus for the end-to-end interconnection of elongated pipe sections of relatively large diameter by external and internal welding thereof at their zone of abutment.

The present invention is further particularly concerned with the provision of improved apparatus for accomplishing the external welding operation upon such a pair of pipe sections in order to practice the process known in the trade as "double jointing." Improved means for accomplishing the internal welding operation and the initial pipe end grinding operation normally included as steps of the mentioned process are covered respectively by our concurrently filed, copending application Serial No. 755,667, filed Aug. 18, 1958, entitled "Apparatus for Effecting an Internally Welded Interconnection Between Pipe Sections," and our concurrently filed, copending application Serial No. 755,668, filed August 18, 1958, now Patent No. 2,931,146, issued April 5, 1960, entitled "Apparatus for Grinding Pipe Ends Preparatory to Interconnection by Welding."

The double-jointing process for interconnecting a pair of end abutted pipe sections by internal and external, submerged arc welding, has been found to possess many advantages in connection with the laying of long pipe lines in that it permits a pair of pipe sections of say forty feet in length, to be interconnected adjacent the general area where the pipe line is being laid into a single eighty-foot pipe length which may be handled as one unit in the laying operation. Heretofore, however, despite the economies and advantages inhering generally in such process, the manual or relatively crude methods and apparatus employed for accomplishing various phases of the pipe handling and the external and internal welding operations have limited the value of the process to an extent far below its optimum potentialities.

Accordingly, it is the primary object of this invention to provide an improved system and apparatus for accomplishing the pipe handling, internal and external welding, and other operations constituting the steps of the double-jointing process.

Another important object of this invention is to provide such a system in which all of the mentioned operations may be performed virtually automatically by means of power operated and other mechanisms subject to control of the actuation thereof by a minimum number of personnel and with the manual performance of the primary operations of the process practically eliminated and replaced by the controlled, automatic operation referred to above.

It is another important object of this invention to provide such a system in which means are provided for mechanically handling and manipulating pipe sections and lengths, and for advancing the same between successive positions at which various operations of the process are performed.

Another important object of the invention is to provide improved apparatus for receiving, bringing into end-to-end abutment, aligning and turning a pair of pipe sections during the external welding of same about their zone of abutting interengagement.

It is another important object of the invention to provide such improved external welding apparatus in which are included driven rollers for shifting one pipe section longitudinally into abutment with another pipe section, means for shifting certain of such rollers for moving the mentioned pipe sections longitudinally in vertical and horizontal planes to accomplish alignment of the two pipe sections, turning roller means for turning the two abutting, aligned pipe sections after the same have been clamped together, means for raising the mentioned turning rollers to free the clamped pipe sections from the aligning and longitudinal shift rollers, and welding means for applying an external weld to the aligned, abutting, clamped pipe sections as the same are rotated upon their longitudinal axis by such turning rollers.

Another important object of the invention is to provide such improved external welding apparatus which includes an alignment clamp carrier shiftable to and away from a position at the outer end of one of the aligned pipe sections for permitting direct ingress and egress of the internal alignment clamp into and out of the pipe sections.

Another important object of the invention is to provide improved means for transferring pipe sections or lengths between incoming or out-going skidways and manipulating rollers forming a part of a welding rack assembly.

Still other important objects of the invention, including certain significant details of construction, will be made clear or become apparent as the following description of an illustrative, currently preferred embodiment of the invention progresses.

In the accompanying drawings:

FIG. 1 is a diagrammatic top plan view of the principal apparatus to be employed in the improved double-jointing system contemplated by the invention and showing the preferred arrangement thereof for optimum control, simplicity and convenience in the shifting of pipe sections and pipe lengths between various parts of the system.

FIG. 2 is a fragmentary, side elevational view of a portion of one of the pipe handling, inclined skidways particularly illustrating the releasable pipe stopping means provided thereon;

FIG. 3 is a cross-sectional view taken on line 3—3 of FIG. 2;

FIG. 4 is a cross-sectional view taken on lines 4—4 of FIGS 1 and 2;

FIG. 5 is a transverse, cross-sectional view of the external welding rack assembly taken on line 5—5 of FIG. 1, showing one of the pipe lowering-in arm assemblies;

FIG. 6 is a fragmentary, cross-sectional view taken on line 6—6 of FIG. 5;

FIG. 7 is a transverse, cross-sectional view of the external welding rack assembly taken on line 7—7 of FIG. 1 and showing one of the kick-out assemblies;

FIG. 8 is a cross-sectional view taken on line 8—8 of FIG. 7;

FIG. 9 is a transverse, cross-sectional view of the external welding rack assembly taken on line 9—9 of FIG. 1, and showing the stationary pair of rollers for longitudinally shifting one pipe section;

FIG. 10 is a fragmentary, elevational view of a part of the external welding rack assembly showing the rollers illustrated in FIG. 9, parts being broken away for clarity of illustration and the line upon which the sectional view of FIG. 9 is taken indicated.

FIG. 11 is a transverse, cross-sectional view of the external welding rack assembly taken on line 11—11 of FIG. 1, and showing the laterally shiftable pair of rollers for longitudinally shifting one pipe section;

FIG. 12 is a fragmentary, elevational view of a part of the external welding rack assembly showing the rollers illustrated in FIG. 11, parts being broken away for clarity of illustration and the line upon which the sectional view of FIG. 11 is taken indicated.

FIG. 13 is a transverse, cross-sectional view of the external welding rack assembly taken on line 13—13 of FIG. 1, and showing the freely floating rollers for longitudinally shifting another pipe section;

FIG. 14 is a fragmentary, elevational view of a part of the external welding rack assembly showing the rollers illustrated in FIG. 13, parts being broken away for clarity of illustration and the line upon which the sectional view of FIG. 13 is taken indicated;

FIG. 15 is a transverse, cross-sectional view of the external welding rack assembly taken on line 15—15 of FIG. 1, and showing vertically shiftable rollers for longitudinally shifting another pipe section;

FIG. 16 is a fragmentary, elevational view of a part of the external welding rack assembly showing the rollers illustrated in FIG. 15, parts being broken away for clarity of illustration and the line upon which the sectional view of FIG. 15 is taken indicated;

FIG. 17 is a perspective view of an exemplary form of internal pipe alignment clamp such as may be utilized as a part of the system contemplated by the invention.

FIG. 18 is a fragmentary, top plan view of a portion of the external welding rack assembly showing the vertically shiftable pair of turning rollers;

FIG. 19 is a cross-sectional view taken on lines 19—19 of FIG. 1 and lines 20—20 of FIG 18;

FIG. 20 is a fragmentary, side elevational view of a part of the external welding rack assembly showing the internal alignment clamp carriage and the means for shifting the latter;

FIG. 21 is a cross-sectional view taken on lines 21—21 of FIGS. 1 and 20;

FIG. 22 is a fragmentary, top plan view of a portion of one of the skidways showing the manner in which an end of same may be secured to the external welding rack assembly or the internal welding rack assembly;

FIG. 23 is a fragmentary, side elevational view of the skidway illustrated in FIG. 22;

FIG. 24 is a view of the external welding station showing the general configuration of the welding head and mounting means therefor, and schematically indicating the relative locations of a pair of turning rollers, the frame of the external welding rack assembly, and a pipe upon the latter in position for performance of the external welding operation; and FIG. 25 is a fragmentary side elevational view of a portion of the external welding station equipment illustrated in FIG. 24.

A general description of the nature, arrangement, functioning and cooperative relationships between the various primary portions of the system contemplated by the invention, will be helpful in understanding the more detailed descriptions of such parts hereinafter set forth. Accordingly, reference is first made to FIG. 1.

A first pair of elevated, inclined, parallel incoming skidways 30 and 32 are adapted to support a number of pipe sections as at 34. Similarly, a second pair of elevated, inclined, parallel incoming skidways 36 and 38 are provided in laterally spaced parallelism to the first pair of incoming skidways 30 and 32 for supporting a number of other pipe sections 40 to be joined to the sections 34. Each of the incoming skidways 30, 32, 36 and 38 is provided with a releasable stop 42 for restraining the sections 34 and 40 against further progress down the mentioned skidways under the force of gravity when the sections 34 and 40 have reached a location adjacent a grinding station 44.

In connection with the grinding station 44, it may be noted that the pipe sections 34 and 40 are normally furnished from the factory with an external end bevel, a portion of which must be uniformly ground away, both in order to present uniform abuttable end surfaces on the pipe sections 34 and 40 and to assure that such surfaces are of sufficient area to permit proper external and internal welding. Accordingly, at the grinding station 44 there may be provided a pair of the improved grinding apparatuses disclosed in our above-mentioned copending application entitled "Apparatus for Grinding Pipe Ends Preparatory to Interconnection by Welding," which has been developed especially for the purpose mentioned, it being noted that the employment of a pair of such grinding apparatuses will permit simultaneous accomplishment of the grinding operations upon both a pipe section 34 and a pipe section 40 next in line for interconnection by external welding.

The lowermost extremities of the skidways 30, 32, 36 and 38 are secured to an elongated, external welding rack assembly 46, it being noted that the skidways 30, 32, 36 and 38 approach the external welding rack assembly 46 from a direction laterally of the latter. Releasable stops 48 similar to the stops 42 are preferably provided upon each of the skidways 30, 32, 36 and 38 adjacent the lower ends of the latter for temporarily stopping and retaining a pipe section 34 or 40 advancing along the corresponding of such skidways. In this connection, it will be understood that the skidways 30, 32, 36 and 38 may be of any desired lengths and the stops 42 and 48 thereon spaced apart as much as desired to allow for the accumulation behind stops 48 of pipe sections 34 and 40 which have had their proximate ends properly ground by the apparatus at the grinding station 44 and which are then released by tripping the stops 42 in order that further pipe sections 34 and 40 may advance to positions adjacent the grinding station 44.

The external welding rack assembly 46 may, if desired, be constructed in a number of releasably interconnectable sections 50, 52 and 54 for convenience in transporting the same. The pipe supporting sections 52 and 54 of rack 46 are each provided with a pair of longitudinally-spaced, lowering-in arms 56 which are swingably mounted on the rack assembly 46 so as to be adapted in a raised position thereof for receiving a pipe section 34 thereon (in the case of rack section 52, or a pipe section 40 thereon in the case of the rack section 54) and for then being shifted to a lowered position depositing such pipe sections 34 and 40 upon certain further rollers mounted on the rack assembly 46 used for shifting the pipe sections 34 and 40 longitudinally of the assembly 46 as mentioned hereinafter.

The last mentioned rollers, which may hereinafter for convenience sometimes be referred to as "endo rollers," include a first pair of endo rollers 58 mounted upon the rack section 52 adjacent the end of the latter proximate rack section 50 for rotation upon a fixed horizontal axis transverse to the rack assembly 46; a second pair of endo rollers 60 adjacent the opposite extremity of rack section 52 and mounted on the latter for shifting movement in either direction transversely of the rack assembly 46 under the influence of power-operated means provided for such purpose; a third pair of endo rollers 62 mounted on the rack section 54 adjacent the extremity of the latter proximate the rack section 62 and endo rollers 60 for floating movement thereof in either direction transversely of the rack assembly 46; and a fourth pair of endo rollers 64 mounted adjacent the opposite end of rack section 54 for rotation upon an axis transverse to the rack assembly 46 but which may be shifted in a vertical sense by power-operated means provided for such purpose.

It is also to be understood that each of the endo rollers 58, 60, 62 and 64 is provided with power means for rotating the same in either direction upon corresponding parallel axes extending transversely of the rack assembly 46. It may also be noted that the endo rollers 62 are essentially free-floating with respect to their shiftability transversely of the rack assembly 46, although spring means may preferably be provided for yieldably biasing the same toward a normal centered position when no pipe section 40 is resting thereupon. It will now be further understood that the lowering-in arms 56 operate to transfer the pipe sections 34 and 40 onto the pairs of endo rollers 58 and 60 and 62 and 64 respectively, from the previous positions of such pipe sections upon the skidways 30, 32, 36 and 38, all without damaging either the endo rollers 58, 60, 62 and 64, or the pipe sections 34 and 40.

When the pipe sections 34 and 40 are first deposited upon the endo rollers 58, 60, 62 and 64 by the lowering-in arms 56, the proximate ends of the pipe sections 34 and 40 will be spaced-apart. Accordingly, the next operation of the apparatus is for the endo rollers 58, 60, 62 and 64 to be rotated for bringing the proximate ends of the pipe sections 34 and 40 into at least partially engaging proximity to one another.

The next operation involves the shifting of the power-operated endo rollers 60 and 64 to effect precise alignment of the pipe sections 34 and 40. Prior thereto, however, it may be desirable for the endo rollers 64 to be lowered to bring the bottom edges of the proximate ends of the pipe sections 34 and 40 into engagement so that they may be interconnected at that point by a manually applied tack weld. The endo rollers 64 may then be raised to bring the pipe section 40 into elevational alignment with the pipe section 34 and the endo rollers 60 may be shifted to one side or the other to bring the pipe sections 34 and 40 into horizontal directional alignment, it being noted that, by virtue of the free shiftability of the endo rollers 62, the portion of pipe section 40 adjacent pipe section 34, may shift horizontally to follow horizontal shifting of the pipe section 34 by the endo rollers 60 and accomplish the desired complete alignment thereof.

After the pipe sections 34 and 40 are thus aligned and supported upon the endo rollers 58, 60, 62 and 64, a carriage 66 reciprocably mounted on the rack section 50 and carrying a hollow tubular nest 68 for receiving a conventional internal pipe-aligning clamp 70, may be shifted by power means provided in the rack section 50 until the flared extremity of nest 68 is received upon the proximate end of pipe section 34. Thereupon, the internal alignment clamp 70 may be rolled directly out of the nest 68 and into the pipe section 34 to a point where the same is operably positioned adjacent the zone of abutting engagement between the aligned pipe sections 34 and 40. Obviously, the alignment clamp 70 will then be operated to clamp the pipe sections 34 and 40 rigidly in their aligned relationship.

The rack section 54 is provided with a pair of elevatable turning rollers 72 preferably having associated therewith both for elevating the same and for turning the same in a like direction at equal speeds. There is also provided upon the rack section 52 a pair of turning rollers 74 of substantially the same construction as the turning rollers 72 and having associated therewith power means for elevating the same, although the turning rollers 74 preferably are not provided with power means for rotating the same. The power rotating means may simply be omitted from the turning rollers 74 since the driven turning of the rollers 72 will be effective to rotate both the pipe sections 34 and 40 which are clamped together by the internal alignment clamp 70. Accordingly, although it is conceivable that the rollers 74 could also be drivingly rotated if desired, such construction might lead to a tendency for the pipe sections 34 and 40 to shift relatively in a rotational sense against the holding action of the clamp 70, in the event that the turning of the rollers 72 and 74 was not precisely synchronized.

The next step of the operation, after clamping of the pipe sections 34 and 40, is for the endo rollers 58, 60, 62 and 64 to be operated in the appropriate direction for locating the zone of abutting engagement between the pipe sections 34 and 40 in proper position longitudinally of the rack assembly 46 and adjacent the welding station 76 provided on the latter, for engagement with such zone by submerged arc welding equipment at the welding station 76 and hereinafter to be more fully described.

With the clamp pipe sections 34 and 40 properly positioned longitudinally of the rack assembly 46, the turning rollers 72 and 74 will be elevated to raise the clamp pipe sections 34 and 40 off of the endo rollers 58, 60, 62 and 64. Such turning rollers 72 and 74 may then be rotated by their associated power means for turning the clamp pipe sections 34 and 40 to rotate the zone of abutting interengagement of the latter past the welding equipment at the welding station 76 for external welding therearound by the latter. After completion of such external welding of the pipe sections 34 and 40 at their zone of abutting engagement, the internal alignment clamp 70 may be released and withdrawn from the pipe section 34 directly into the nest 68 which has been withdrawn from the pipe section 34 during the welding operation and is again advanced into contact with the latter for directly receiving the alignment clamp from the pipe section 34. Such nest 68 and alignment clamp 70 are then again reciprocated by the power means provided on rack section 50 for such purpose in a direction away from the pipe section 34.

Provided upon each of the rack sections 52 and 54 is a kick-out arm 78 provided with power means for swinging the same to lift the externally welded pipe sections 34 and 40 off of the turning rollers 72 and 74 and transfer the same onto a pair of elevated, inclined, parallel, outgoing skidways 80 and 82 having their upper ends secured to the rack assembly 46 and extending laterally of the latter in a direction opposite to the skidways 30, 32, 36 and 38. An externally welded pipe length designated 84 in FIG. 1 is shown upon the skidways 80 and 82 rolling by the action of gravity toward releasable stops 86 on the skidways 80 and 82 adjacent their lowermost ends.

There is provided at the lowermost ends of skidways 80 and 82, an elongated, internal welding rack assembly 88, which may also be constructed in interconnectable sections 90 and 92 if desired, the lower ends of the skidways 80 and 82 being respectively secured to the sections 90 and 92.

The rack assembly 88 includes a pair of lowering-in arms 94 thereon, onto which the pipe length 84 may advance when the stops 86 are released. The lowering-in arms 94 are power-operated for lowering the pipe length 84 onto pairs of turning rollers 96 and 98 on rack assembly 88.

One of the pairs 96 of turning rollers is preferably power-operated for rotation of same at equal speeds and in like directions to turn a pipe length 84 thereon during the internal welding of the latter, while the turning rollers 98 are preferably freely rotatable idlers.

In spaced alignment to the rack assembly 88 is a track assembly 100 upon which is reciprocably mounted a carriage 102 which in turn carries an elongated boom 104 adapted to be inserted into a pipe length 84 on the turning rollers 96 and 98. Power means are provided on the carriage 102 for reciprocating the same along the track assembly 100. The boom 104 carries adjacent its outermost end a pallet 106 for supporting a human operator in position to control a submerged arc internal welding head 106 and various controls associated with the latter.

Further details concerning improved constructions for the rack assembly 88 and track assembly 100 are set forth in our above-referred to copending application entitled "Apparatus for Effecting an Internally Welded Interconnection Between Pipe Sections."

It may be noted, however, that after transfer of a pipe length 84 onto the turning rollers 96 and 98, the carriage 102 is moved to insert the boom 104 with a human operator on the pallet 106 into the pipe length 84 until the welding head 108 is properly aligned with the internal zone of abutment between the pipe sections 34 and 40. Thereupon, the power means for drivingly rotating the turning rollers 96 is operated to turn the pipe length 84, and during such turning of the latter the welding head 108 and associated apparatus apply an internal weld to the zone of abutment of the pipe sections 34 and 40 under the direct surveillance and control of the human operator on pallet 106. After the internal weld is completed, the carriage 102 is shifted to withdraw the boom 104 from the now completely welded, double-jointed pipe length 84.

A pair of kick-out arms 110 are provided on the rack assembly 88 for transferring the completed pipe length 84 onto a pair of inclined, parallel skidways 112 and 114 leading laterally away from the rack assembly 88 and constituting a storage facility for the completed pipes 84 or a means for gravitational movement of the latter to other suitable storage rack facilities.

It will thus be clear that the system contemplated by the invention is fully integrated in the arrangement and cooperative relationships between the various parts thereof with a view to providing practically automatic performance of the entire double-jointing process in a minimum of time and with the requirement of a minimum number of personnel. With such over-all view of the improved system as a whole recognized, description may now be given of various more detailed portions of the improved apparatus utilized in such system.

Referring now to FIGS. 2, 3 and 4, there is illustrated one of the releasable stop mechanisms such as at 42, 48 and 86. For purposes of illustration, since all of such devices may be similarly constructed, there is shown one of the devices 42 associated with the skidway 30. As will be apparent from the drawings, the skidway 30 is generally inverted channel-like in configuration and includes a top wall 202 and a pair of spaced, depending side walls 204 and 206. The stop device 42 includes a trippable dog element 208 pivotally supported between the walls 204 and 206 of skidway 30 by a pin 210. Spaced from the element 208 is a further pivot pin 212 extending between the walls 204 and 206 of skidway 30 and pivotally supporting one end of a hydraulic cylinder assembly 214 having a reciprocable piston 216 coupled with a lower portion of the element 208 below the pivot pin 210 by means of a yoke 218 and a pivot pin 220. It will be clear that when the piston 216 is extended, the element 208 is swung to the position illustrated in FIG. 2 for stopping a pipe progressing down the slightly inclined skidway 30 in the direction indicated by the arrow 222. When it is desired to release the pipe for further travel along the skidway 30, the cylinder assembly 214 is actuated to draw the piston 216 thereof thereinto, which swings the stop dog element 208 in a direction not only clearing the path for further travel of the pipe, but also tends to start the pipe upon its rolling travel by virtue of the pushing engagement of surface 224 of the element 208 which is swung counterclockwise in FIG. 2.

Referring next to FIGS. 5 and 6, it will be seen that the external welding rack assembly 46 includes a rigid frame 116 comprised of a plurality of members interconnected in any suitable fashion as by welding and including, for example, longitudinal upper side members 118 and 120, longitudinal lower side members 122 and 124, various interconnecting upper cross members as at 126, various lower cross members as at 128, and various upright members as at 130.

One of the lowering-in arms 56 is illustrated and will be seen to include a generally U-shaped assembly having a sleeve-like bight 132 pivotally mounted on a pin 134, extending through upright bracket elements 136 and 138 secured to cross members 126, and a pair of elongated, curved legs 140 and 142 extending in parallelism from the bight portion 132 and having concavely curved, uppermost surfaces as at 144. Rotatably mounted between the legs 140 and 142 are an outer roller 146 carried by a pin 148 and an inner roller 150 carried by a pin 152. Spaced plates 154 and 156 are secured in depending relationship from a pair of adjacent, but spaced members 126 and rotatably carry a pin 158 to which is clamped by means 160, a hydraulic cylinder assembly 162 having a piston 164 pivotally coupled with the legs 140 and 142 of lowering-in arm 56 by means of a pin 166.

It will be clear that pipe sections 34 or 40 leaving the skidways 30 and 32 (or 36 and 38, as the case may be) upon release of the corresponding stops 48, will roll by gravity onto the lowering-in arms 56 during a period when the corresponding cylinder assemblies 162 are actuated to swing the arms 56 to their raised positions. Such cylinder assemblies 162 may then be operated by associated conventional controls (not shown) to lower the arms 56 to the position illustrated in FIGS. 5 and 6, during which lowering of the arms 56 the pipe section 34 or 40 thereon will be deposited upon the corresponding pair of endo rollers 58 and 60 or 60 and 64. The small rotatable rollers 146 and 150 on the lowering-in arms 56 serve to help center a pipe section 34 or 40 upon a pair of lowering-in arms 56 and to prevent such pipe section from any tendency to oscillate or roll toward the extremities of the latter.

Referring next to FIGS. 7 and 8, there is illustrated one of the kick-out arms 78. Each kick-out arm 78 is somewhat similar in construction to the above-described lowering-in arms 56 and includes a sleeve-like bight portion 168 pivotally supported on a pin 170 extending between upstanding brackets 172 and 174 on corresponding cross members 126 of frame 116, and a pair of elongated, curved legs 176 and 178 extending in parallelism and having rotatably mounted therebetween an inner roller 180 upon a pin 182 and an outer roller 184 upon a pin 186. A hydraulic cylinder assembly 188 is pivotally mounted by a pin 190 and clamping means 192 on a pair of brackets 194 and 196 depending from a pair of frame cross members 126. The cylinder assembly 188 is provided with a reciprocable piston 198 which is pivotally connected with the legs 176 and 178 of the arm 78 by a pin 200 extending between legs 176 and 178 intermediate the extremities of the latter.

It will thus be clear that the kick-out arms 78 are adapted upon actuation of their cylinder assemblies 188 to be swung from the solid line position in FIG. 7, to the elevated position shown in dotted lines in such figure. During the course of such swinging movement of the kick-out arms 78, same are raised into contact with the bottom of an externally welded pipe 84 to lift the same off of the turning rollers 72 and 74 and discharge the same by rolling action under the influence of gravity onto the skidways 80 and 82.

It may be noted that the lowering-in arms 94 on the internal welding rack assembly 88 may be constructed in substantially the same fashion as the lowering-in arms 56 on the external welding rack assembly 46, and that similarly, the kick-out arms 110 on the internal welding rack assembly 88 may be constructed and operated in fashion analogous to that described for the kick-out arms 78 on the external welding rack assembly 46.

Referring now to FIGS. 9 and 10, there is illustrated the fixed axis pair of endo rollers heretofore generally designated 58. Such rollers 58 actually include a pair of spaced rollers 226 and 228 having inwardly tapered, arcuate faces 230 and 232 respectively of rubber or the like.

The rollers 226 and 228 are secured in predetermined spaced relationship upon an intermediate threaded stretch 234 of a shaft 236 by means of nuts 238. The shaft 236 extends transversely of the rack section 52 and is supported upon a fixed axis by means of a pair of upstanding, spaced brackets 240 and 242 mounted on a special crosspiece assembly 244 extending transversely of the rack assembly 46 and secured to the frame members 122 and 124 as by spacer or buffer blocks 246 and bolt means 248. At one end thereof the shaft 236 is provided with sprocket means 250 for receiving a chain 252 also trained about a sprocket 254 operably coupled through a gear box 256 with an electric motor or other prime mover 258, the motor 258 and gear box 256 being mounted upon the cross assembly 244 in any suitable manner. It will be clear that the cooperating surfaces 230 and 232 of rollers 226 and 228 of the endo roller pair 58, cooperate to present spaced, saddled contact means for engaging and supporting a pipe section 34. It will further be clear that the motor 258 should be reversible in character in order that the endo rollers 58 may be rotated in either direction as required for proper positioning of a pipe section 34 thereupon.

Reference may now be made to FIGS. 11 and 12 in which is illustrated in greater detail the construction of the laterally shiftable endo rollers 60 and the parts operably associated therewith. The endo rollers 60 include a pair of spaced rollers 260 and 262 constructed and mounted upon a rotatable shaft 264 extending transversely of the rack assembly 46 in manner similar to that above described for the rollers 226 and 228 of the endo roller pair 58.

The shaft 264 is rotatably carried by a pair of upstanding brackets 266 and 268 mounted upon a laterally shiftable plate 270 which is supported upon laterally spaced rollers 272 and 274 in turn rotatably mounted upon a special cross assembly 276 extending transversely of the frame 116. Also mounted upon the shiftable plate 270 is a reversible, electric motor or other prime mover 278 coupled through a gear box 280 with a drive sprocket 282. The shaft 264 is provided with a sprocket 284 aligned with the sprocket 282 and connected with the latter by means of a chain 286. A hydraulic cylinder assembly 288 is pivotally coupled by a pin 290 with a supporting bracket 292 secured to a fixed vertical plate 294 rigidly secured to the cross assembly 176 adjacent one end of the latter. A reversibly reciprocable piston 296 extends horizontally from the cylinder assembly 288 and is coupled by a yoke 298 and a pin 300 with a bracket 302 secured to, and depending from, the plate 270.

It will thus be apparent that the later positioning of the endo rollers 60 may be altered by operation of the cylinder assembly 288 without affecting the rotatability of such endo rollers 60 by the prime mover 278.

Reference may next be made to FIGS. 13 and 14, wherein is illustrated the laterally floatingly mounted endo rollers 62, together with the structure associated therewith. Laterally floating endo rollers 62 include a pair of separate rollers 304 and 306 constructed and mounted upon a shaft 308 in manner similar to that described for rollers 226 and 228 of endo rollers 58. In manner somewhat analogous to that described for the endo rollers 60, the shaft 308 is rotatably carried by a pair of upstanding brackets 310 and 312 mounted upon a laterally shiftable plate 314 carried upon spaced rollers 316 and 318 in turn rotatably mounted upon a special cross assembly 320 extending transversely of the rack assembly 46 and secured in the latter in any suitable manner.

The shaft 308 is provided with a sprocket 322 coupled by chain means 324 with a sprocket 326 on a gear box 328 having a reversible electric motor or other prime mover 330 mounted thereon and connected thereto.

Opposed stop members 332 and 334 are mounted on cross assembly 320 and are engageable with the opposite extremities of the plate 314 for limiting the path of lateral shifting movement of such plate 314. Since the plate 314 is supported between guides 336 rising from the assembly 320, it is confined to a linear path of travel transversely of the rack assembly 46, but is essentially freely shiftable along such path of travel upon the rollers 316 and 318.

In order to yieldably bias the endo rollers 62 toward an inntermediate position, particularly in the absence of a pipe section 40 thereupon, there may be provided a pair of springs 338 and 340. The spring 338 bears at one end thereof against a bracket 342 secured to the plate 314 and depending therefrom and oppositely bears against a stop disc 344 secured to a guide rod 346 passing through the spring 338 and rigidly secured to a bracket 348 on the cross assembly 320. The spring 340 is operably coupled with the plate 314 in manner similar to that described for the spring 338. It will be understood that the springs 338 and 340 bias the endo rollers 62 toward an intermediate position with only such force as necessary to accomplish that general result when no pipe section 40 is supported upon the endo rollers 62, and should not be of such strength as to interfere with the relatively free floating action of the endo rollers 62 transversely of the rack assembly 46 when a pipe section 40 is supported thereupon and tends to be swung laterally when a pipe section 34 to which it is tack welded is swung laterally by the power-controlled shifting of the endo rollers 60. Again, it will be clear that the mounting of the endo rollers 62 for lateral shifting movement, in no way interferes with their rotation in either direction by the prime mover 330.

Reference is next made to FIGS. 15 and 16, wherein is illustrated the elevatable endo rollers 64. Again, endo rollers 64 include a separate spaced pair of contoured rollers 350 and 352 constructed and mounted upon a rotatable shaft 354 in manner similar to that described for rollers 226 and 228 of pair 58 thereof.

A special cross assembly 356 extending transversely of the rack assembly 46 and secured to the frame 116 in any suitable manner, is provided thereon with a pair of spaced, upstanding brackets 358 and 360. The brackets 358 and 360 carry a pivot shaft 362 upon which is mounted the fulcrum sleeve 364 of a crank assembly 366 further including a pair of generally upstanding, spaced, parallel arms 368 and a pair of generally downwardly-extending, spaced, parallel arms 370. The shaft 354 is rotatably mounted on the arms 368 with the rollers 350 and 352 between the latter. The arms 370 are coupled by a pivot pin 372 with the reciprocable piston 374 of a hydraulic cylinder assembly 376 whose opposite extremity is pivotally coupled by a pin 378 with a stationary bracket 380 secured to a further crosspiece 382 rigid to frame 116. It will be clear that, as the cylinder assembly 376 is actuated to reciprocate its piston 374 inwardly or outwardly, the crank 366 will be correspondingly rotated upon the pivot shaft 362 to swing the arms 368 and the shaft 354 and rollers 350 and 352 upwardly or downwardly.

In view of the pivotal mounting of the arms 368 supporting shaft 354, special care must be taken in arranging a driving coupling with the latter for rotating the same which will be unaffected by the elevation or lowering of the arms 368. Accordingly, in this case, a reversible electric motor or other prime mover 384 and its associated gear box 386 are mounted upon a platform 388 stationarily secured to the cross assembly 356 and so positioned that the drive shaft 390 of gear box 386 is in alignment with the axis of the pivot shaft 362 about which the arms 368 are swingably mounted. The drive shaft 390 is provided with a drive sprocket 392 coupled with a sprocket 394 on shaft 354 by means of a chain 396.

Referring next to FIG. 17, there is illustrated in perspective the general construction of one now conventional, suitable type of internal alignment clamp 70 adapted for use in clamping the pipe sections 34 and 40 together in aligned condition upon the external welding rack assembly 46. The construction of such alignment clamp per se forms no part of the instant invention and it is believed sufficient to note that such clamps 70 are available commercially from M. J. Crose Manufacturing Co., Inc., of Tulsa, Oklahoma, and that the same preferably include wheels as at 398, 400, 402 and 404 for rendering the clamp 70 mobile and guiding the same during travel within the nest 68 or a pipe section 34. The construction and mode of operation of such clamp 70 is well known to those skilled in the art.

Reference is next made to FIGS. 18 and 19, wherein is illustrated the driven turning rollers heretofore generally designated 72, it being understood that the turning rollers 74 may be of similar construction except that, as heretofore observed, the power means for rotating the turning rollers 74 may be omitted so that they are freely rotatable, although means similar to that now to be described in connection with turning rollers 72 must be provided in connection with turning rollers 74 for controlling the elevation of the latter.

A strong elongated shaft 408 is extended between the top side members 118 and 120 of the frame 116 of rack assembly 46, preferably at a zone where such side members 118 and 120 are supported by post members 130. Rotatably mounted upon such horizontal, transverse shaft 408, and operably separated from engagement with each other and the members 118 and 120 as by washer sleeves 410, 412, and 414, are a double sprocket 416 and the elongated sleeve portion 418 of a crank assembly generally designated 420 further including a pair of parallel, spaced arms 422 and 424 extending generally longitudinally of the rack assembly 46.

An electric motor or other suitable prime mover as at 426 is coupled through a gear box 428 with a driven shaft 430 having a sprocket 432 thereon, both the prime mover 426 and gear box 428 being secured to a platform 434 mounted on the frame 116 of rack assembly 46. The sprocket 432 is coupled by a chain 436 with one sprocket portion of the double sprocket 416.

The crank arms 422 and 424 carry adjacent their outermost extremities, a pair of laterally extending, spaced crosspieces 438 and 440, in turn rotatably carrying a pair of spaced, parallel shafts 442 and 444 extending generally longitudinally of the rack assembly 46 and having respectively mounted thereon a pair of preferably rubber-faced rollers 446 and 448 constituting the turning rollers 72. Intermediate the extremities of the crank arms 422 and 424, the same carry a laterally extending subframe 450 upon which is mounted a pair of right-angle drive assemblies 452 and 454 operably interconnected by a shaft 456. The output shaft 458 of each of the right-angle drive boxes 452 and 454 is connected through a coupling 460 with the corresponding of turning roller shafts 442 and 444 for rotating the latter. The right-angle drive box 452 is provided with an input shaft 462 having a sprocket 464 thereon coupled by a chain 466 with the other sprocket portion of the double sprocket 416. By virtue of the alignment of the axes of rotation of the double sprocket 416 and the crank assembly 420, it will be apparent that rotation of the rollers 446 and 448 will not be impaired by virtue of any elevational adjustment of the rollers 446 and 448 through swingable movement of the crank 420.

A special cross member 468 secured to the frame 116 between the lower side members 122 and 124 thereof, carries a bracket 470 to which a hydraulic cylinder assembly 472 is pivotally connected by means of a pivot pin 474. As with all of the hydraulic cylinder assemblies heretofore referred to, it is understood that the cylinder assembly 472 may be of the type which is reversible in any direction, if desired, although the forces applied thereagainst may actually require positive action of the assembly 472 only during elevation and holding of the turning rollers 72. The cylinder assembly 472 is provided with a reciprocable piston 476 pivotally coupled by a pin 478 with one arm 480 of a crank 482 pivotally mounted upon a shaft 484 carried by brackets 486 and 488, in turn secured to a transverse cross member 490 mounted on the frame 116 between the upper side members 118 and 120 thereof. The other arm 492 of crank 482, is coupled by a pivot pin 494 with a link 496 oppositely coupled pivotally by a pin 498 with brackets 500 on the crosspiece 438 attached to the crank assembly 420. The turning rollers 72 are illustrated in fully elevated condition in FIG. 19, and it will be apparent that when the piston 476 is permitted to reciprocate inwardly, the crank 482 will be turned to swing the crank 420 downwardly for lowering the elevation of the rollers 446 and 448.

Referring next to FIGS. 20 and 21, there is illustrated in greater detail, the construction of the section 50 of the external welding rack assembly 46. There are mounted atop the side members 118 and 120 of frame 116 extending longitudinally of the rack section 50, a pair of spaced, parallel tracks 502 and 504, track 502 preferably being of inverted V-shaped cross section, while the track 504 is provided with a flat, uppermost track surface.

The carriage heretofore generally designated 66 for carrying the alignment clamp 70 onto and from a point of ingress and egress relative to the pipe section 34, includes a lower frame 506 provided with a pair of longitudinally spaced, peripherally grooved wheels 508 on one side thereof operably engaging the track 502, and a pair of longitudinally spaced wheels 510 on the other side thereof and operably supported upon the track 504. The wheels 508 and 510 are freely rotatable relative to the frame 506 to render the latter shiftable longitudinally of the rack section 50 upon the tracks 502 and 504.

The nest 68 is elongated, cylindrical and may most conveniently be formed from a length of pipe of the same diameter as that of the pipe sections 34 and 40 to be handled by the rack assembly 46. The nest 68 is outwardly flared as at 512 by slitting as at 514 and outward bending. Since the system contemplated by the invention may from time to time, handle pipe sections 34 and 40 of differing diameters, it is significant that means are provided for releasably mounting the nest 68 upon the frame 506 of carriage 66 so that nests 68 of various diameters may be kept at hand and interchanged as necessary.

Such mounting means includes a pair of rear springs 516 and a pair of front springs 518 respectively, adapted for coupling between rear brackets 520 on the nest 68 and 522 on the frame 506 and front brackets 524 on the nest 68 and 526 on the frame 506, together with upwardly concave, rear and forward cradle elements 528 and 530 respectively for receiving and carrying the nest 68 on the frame 506. It will be understood that with a nest 68 of diameter appropriate for use with a given diameter of pipe sections 34 and 40, the corresponding size of alignment clamp 70 will automatically also be ideally accommodated by the nest 68.

Since it is normally desired to bring the nest 68 into firm engagement with the proximate end of a pipe section 34 in order to permit ready transfer of the alignment clamp means 70 therebetween, and since power means hereinafter to be described are provided for reciprocating the carriage 66 and nest 68 to and from such position, it is desirable that impact cushioning means in the nature of a spring 532 oppositely interconnected at its forward end with a bracket 534 on frame 506 and at its rear end with a bracket 536 on nest 68, be provided to retain the nest 68 in approximately the desired position on the frame 506 while allowing for reciprocable shifting therebetween upon impact of the nest 68 with the end of a pipe section 34.

The power-operated means for shifting the carriage 66 and nest 68 along the tracks 502 and 504 includes a reversible electric motor or other suitable prime mover 538 coupled through a speed reduction box 540 with a drive sprocket 542, the gear box 540 and motor 536 being rigidly mounted relative to the frame 116 upon a cross assembly 544.

Also rigidly secured to cross assembly 544 are a pair of upstanding brackets 546 and 548 rotatably carrying a shaft 550 extending transversely of the rack assembly 46 and having a pair of sprockets 552 and 554 carried thereby. The drive sprocket 542 is coupled with sprocket 552 on shaft 550 by a chain 556. Rotatably mounted adjacent the rear of rack section 50 for rotation upon an axis transverse to the rack assembly 46, is a sprocket 558 longitudinally aligned with the sprocket 554 on shaft 550. A chain 560 is operably trained over sprockets 554 and 558 and has connected in the upper stretch thereof an upstanding coupling element 562 extending upwardly between the tracks 502 and 504 and secured at its upper extremity to the frame 506 of carriage 66. Accordingly, when the motor 538 is actuated, the shaft 550 is turned to move chain 560 whose coupling element 562 in turn imparts a shifting force to the frame 506 of carriage 66 to advance or withdraw the nest 68 relative to the proximate end of a pipe section 34 upon the external welding rack assembly 46. If desired, a forward stop 564, engageable with the coupling element 562 may be provided on the frame 116 for preventing the carriage 66 from being moved beyond the forward extremities of tracks 502 and 504.

Referring next to FIGS. 22 and 23, it will be seen that the various skidways such as the skidway 30 chosen for purposes of illustration, may be supported by ground-engaging jack means 566 supporting crossbars 568 secured to the lower side of the skidway 30. The use of adjustable jack means 566 permits the desired inclination of the skidway 30 irrespective of minor terrain features in the ground upon which the system is to be installed, it being understood that the apparatus contemplated by the invention is adapted for practical utilization in the field.

FIGS. 22 and 23 further illustrate the manner in which bracket assemblies generally designated 570, and having a pair of upstanding, spaced, parallel brackets 572 and 574 thereon, may be mounted upon the frame 116 by bolting or the like to a side member such as 118 and cross members as at 576 provided for such purpose with such bracket assemblies 570 serving to provide a releasable securement on the rack assembly 46 for the adjacent ends of skidways such as 30.

The brackets 572 and 574 have their upper surfaces provided with V-shaped notches as at 578 for receiving and guiding into position, a crosspin 580 extending laterally in both directions from each of the skidways 30, etc., adjacent the end thereof. After the crosspins 580 are seated within the notches 578, washers as at 582 may be provided upon the ends of the pin 580 externally of the brackets 572 and 574 and held in position as by cotter keys 584; where a particular installation is to be of semi-permanent nature it may be desired to spot-weld the washers 582 to the adjacent brackets 572 or 574, although such practice is not required and normally no difficulty is encountered in connection with the bracket assemblies 570 properly retaining the crosspins 580 to maintain proper positioning of the corresponding skidway such as 30.

Referring now to FIGS. 24 and 25, it will be seen that a typical grinding station 44 may include an upright standard 586 rigidly secured to the frame 116 of rack assembly 46 as by a sub-frame generally designated 588, pinned as at 590 or otherwise fastened to the upper and lower side members 120 and 124 of frame 116. The standard 586 will normally carry a horizontal boom 592 extending longitudinally of the rack assembly 46. A carriage assembly generally designated 594 is shiftably mounted upon the boom 592 for reciprocation along the latter longitudinally of the rack assembly 46. Shiftably carried by the carriage 594 is a sub-carrier 596 to which in turn is shiftably secured a conventional submerged arc welding head generally designated 598 which may be one of the types offered commercially by the Lincoln Electric Company of Cleveland, Ohio.

It will be understood that various adjustments are normally provided for altering the positioning of the welding head 498 relative to the standard 586 and, therefore, a pipe section 34 carried upon turning rollers 74. Since the details of the welding head 598 per se, and the means of shiftably mounting the same upon the sub-carrier 596, the sub-carrier 596 upon the carriage 594 and the latter upon the boom 592, of themselves constitute no part of the present invention, further description of such details is believed unnecessary. Suffice it to say, therefore, that the welding head 598 may be positioned by an operator so as to automatically weld a pair of aligned pipe sections 34 and 40 on the turning rollers 72 and 74 as such pipe sections are turned by such turning rollers, and that the welding head 598 may then be withdrawn to a position where same will not interfere with the discharge of the externally welded pipe length 84 onto the skidways 80 and 82 by operation of the kick-out arms 78.

It will now be clear that the system and apparatus contemplated by this invention are adapted to attain all of the above-mentioned and other advantageous objects thereof. It will be equally manifest, however, that certain details of construction may be modified or changed from those shown and described herein for illustrative purposes without departing from the true spirit and intention of the invention. Accordingly, it is to be understood that the invention should be deemed limited only by the scope of the claims that follow.

Having thus described the invention, what is claimed as new and desired to be secured by Letters Patent is:

1. In a welding positioner and manipulator for the end-to-end interconnection of pairs of pipe sections of relatively large diameter by welding, a first pair of elongated, elevated, spaced, parallel, inclined skidways adapted to support a first elongated pipe section thereupon in transversely extending relationship thereto for advancement by gravity toward the lower ends thereof; a second pair of elongated, elevated, spaced, parallel inclined skidways in spaced parallelism to said first pair of skidways and constructed and arranged to support a second elongated pipe section thereupon in transversely extending relationship thereto for advancement by gravity toward the lower ends thereof; an elongated external welding rack assembly extending transversely to said first and second pairs of skidways adjacent the lower ends of the latter and coupled therewith to fix the relative positions of said skidways and rack; first power operated, shiftable means coupled with said external welding rack assembly and shiftable into a position adjacent to said first pair of skidways to receive a first pipe section from said first pair of skidways for transferring said first pipe section from the lower ends of said first pair of skidways onto said external welding rack assembly; second power operated, shiftable means coupled with said external welding rack assembly and shiftable into a position adjacent to said second pair of skidways to receive a second pipe section from said second pair of skidways for transferring said second pipe section from the lower ends of said second pair of skidways onto said external welding rack assembly in longitudinally spaced relationship to said first pipe section; third power operated, shiftable means on said external welding rack assembly for shifting at least said second pipe section longitudinally toward and into end abutting relationship with said first pipe section; fourth power operated, shiftable means on said external welding rack assembly for aligning said first and second pipe sections; fifth power operated, shiftable means on said external welding rack assembly for turning said aligned first and second pipe sections together about the longitudinal axis thereof; external welding means on said external welding rack assembly for welding said first and second pipe sections together externally thereof around their zone of abutment while said pipe sections are turned together about the longitudinal axis thereof to present a rigid, dual section pipe length; a third pair of elongated, elevated, spaced parallel inclined skidways coupled with said rack and constructed and arranged to support said pipe length thereupon in transversely extending relationship thereto for advancement by gravity toward the lower ends thereof, said third pair of skidways extending away from said external welding rack assembly laterally to the latter in a direction opposite to said first and second pairs of skidways and having their upper ends adjacent said external welding rack assembly; and sixth power operated, shiftable means coupled with said external welding rack assembly and shiftable to engage and remove said pipe length by transferring said pipe length from said external welding rack assembly onto said third pair of skidways.

2. In a welding positioner and manipulator as set forth in claim 1, wherein is provided internal pipe clamping means coupled with said rack and constructed and arranged to be removably shifted into said first and second pipe sections for clamping the latter in relatively fixed relationship after said pipe sections have been aligned by said fourth power operated means and until the same have been interconnected by said external welding means; and carriage means shiftably mounted on said external welding rack assembly for transporting said clamping means to and from a zone of direct ingress and egress of the latter into and out of one of the said pipe sections.

3. In a welding positioner and manipulator as set forth in claim 2, wherein said fifth power operated means, besides being shiftable to turn said clampingly interconnected pipe sections, also includes independently shiftable parts for moving said pipe sections away from said fourth power operated means prior to said first mentioned shifting of said fifth power operated means for turning said pipe sections.

4. In a pipe handling rack assembly, an elongated frame; four pairs of pipe receiving and manipulating rollers spaced longitudinally of said frame; means mounting a first pair of rollers on the frame for rotation about substantially fixed axes extending generally transversely of the longitudinal axis of the frame; means mounting the second and third pairs of rollers on the frame for movement substantially transversely of the frame and for rotation about axes generally parallel to the axes of rotation of said first pair of rollers; means mounting the fourth pair of rollers on the frame for movement upwardly and downwardly relative to said frame and for rotation about axes generally parallel to the axes of rotation of the third pair of rollers, said first and second pairs of rollers being disposed to receive a first section of pipe and said third and fourth pairs of rollers being disposed to receive and support a second section of pipe with the pipe sections positioned in substantially end-to-end relationship; and means connected to said second and fourth pairs of rollers respectively for shifting the second pair of rollers transversely of the longitudinal axis of the frame and for shifting the fourth pair of rollers upwardly and downwardly with respect to the frame whereby the pipe sections may be brought into substantially exact axial alignment by shifting the positions of said second and fourth pairs of rollers relative to the positions of said first and third pairs of rollers.

5. An assembly as set forth in claim 4 wherein are provided independently controllable power means operably coupled to each of said second and fourth pairs of rollers for permitting independent shifting of the latter.

6. An assembly as set forth in claim 5 wherein said third pair of rollers is located between said second and fourth pairs of rollers and said second pair of rollers is located between said first and third pairs of rollers.

7. An assembly as set forth in claim 6 wherein are provided independently controllable prime movers operably coupled to at least one of said first and second pairs of rollers and at least one of said third and fourth pairs of rollers for rotating the same.

8. An assembly as set forth in claim 4 wherein are provided first and second pairs of further rollers spaced longitudinally of said frame and each rotatable about corresponding axes disposed longitudinally of the frame.

9. An assembly as set forth in claim 8 wherein is provided means shiftably mounting said further rollers on the frame for movement upwardly and downwardly relative thereto, and means connected to said further rollers for shifting the latter along the path of movement of the same in a direction toward and away from the frame.

10. An assembly as set forth in claim 9 wherein are provided separate power means operably coupled to each of said further pairs of rollers for shifting the latter.

11. An assembly as set forth in claim 10 wherein is provided a prime mover operably coupled with only one of said pairs of further rollers for rotating the same.

12. An assembly as set forth in claim 4 wherein is provided a longitudinal track on said frame adjacent one extremity of the latter, a carriage supported on the track for movement therealong, and a generally cylindrical, alignment clamp receiving nest on said carriage, whereby an alignment clamp received in said nest may be inserted into and removed from said pipe sections by said carriage moving along said track to exactly align said pipe sections after previous general alignment by said rollers.

References Cited in the file of this patent

UNITED STATES PATENTS

| | | |
|---|---|---|
| 1,679,499 | Rupley | Aug. 7, 1928 |
| 1,870,760 | Tipton | Aug. 9, 1932 |
| 1,922,913 | Free et al. | Aug. 15, 1933 |
| 1,972,029 | Norquist | Aug. 28, 1934 |
| 2,034,451 | Tripp | Mar. 17, 1936 |
| 2,043,556 | Protin | June 9, 1936 |
| 2,260,260 | Mikesh | Oct. 21, 1941 |
| 2,519,837 | Lampard | Aug. 22, 1950 |
| 2,655,585 | Braun | Oct. 13, 1953 |
| 2,749,421 | Mikulak | June 5, 1956 |